Figure 1:
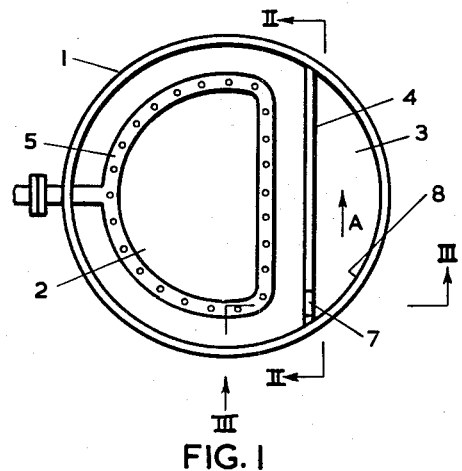

March 29, 1966  P. G. CAUDLE ET AL  3,243,169

REACTION VESSELS

Filed Sept. 18, 1962  2 Sheets-Sheet 1

Inventors
Peter G. Caudle
Ronald C. Snell
by Albert J. Jack
atty

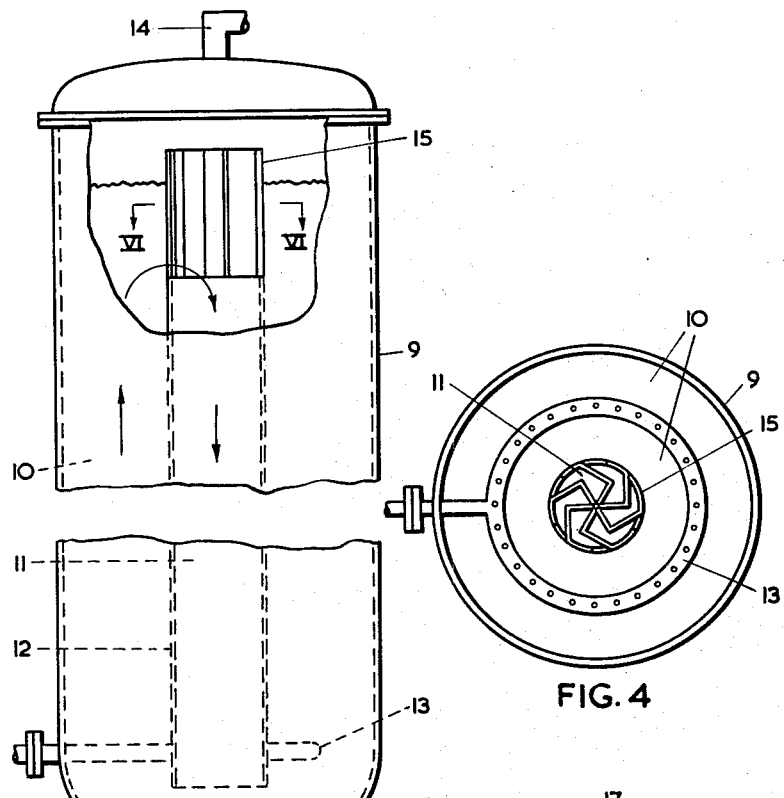
FIG. 4
FIG. 5
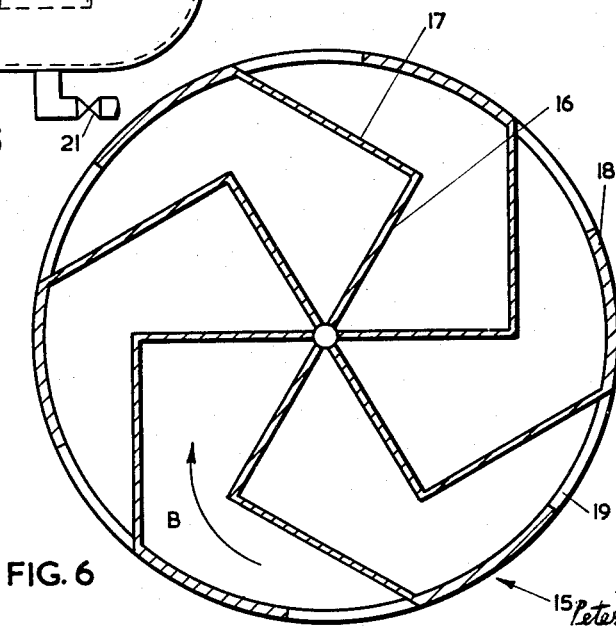
FIG. 6

United States Patent Office 3,243,169
Patented Mar. 29, 1966

3,243,169
REACTION VESSELS
Peter Grainger Caudle, Merstham, Surrey, and Ronald Charles Snell, Stoneleigh, Surrey, England, assignors to The Distillers Company Limited, Edinburgh, Scotland, a company of Great Britain
Filed Sept. 18, 1962, Ser. No. 226,477
Claims priority, application Great Britain, Oct. 17, 1958, 33,126/58
5 Claims. (Cl. 261—74)

The present invention relates to reaction vessels, and in particular to reaction vessels in which a liquid phase is caused to circulate as a result of a density differential set up by the introduction of a gaseous phase and is a continuation-in-part of that described in our application Serial No. 843,682 filed October 1, 1959, now abandoned.

Reaction vessels of this type consist essentially of two vertical zones connected at the top and at the bottom. A gas, which may or may not constitute one of the reactants, is introduced into the liquid phase in a finely dispersed state at the bottom of one of the zones. The introduction of the gaseous phase causes a difference in density between the liquid contents of the two zones with the result that circulation takes place, the direction of the flow being upwards in the zone into which the gas is fed and downwards in the other zone. In the specification the two zones are referred to as the zone of liquid upflow, and the zone of liquid downflow, respectively. At the top of the reaction vessel the gas separates from the liquid and is released from the reaction vessel. The circulation of the vessel contents ensures adequate heat transfer and mixing of the reactants. Reaction vessels of this type can be employed when the provision of mechanical means of agitation is undesirable, for instance where the reaction mixture is corrosive, or where the reactor is operated under increased pressures.

In most reaction vessels of this type there is an incomplete separation of gas from the liquid at the top of the reaction vessel, so that gas bubbles are carried down into the zone of liquid downflow. As a result of difference in density between the liquid contents of the two zones is small, and a high circulation rate is not achieved.

It is an object of the present invention to provide an improved reaction vessel of the type described in which improved separation of the gas from the liquid takes place at the top of the reaction vessel, and in which substantially increased circulation rates are obtained.

Accordingly, the present invention is for a reaction vessel comprising a hollow body portion, means for dividing the hollow body portion into a liquid upflow zone and a liquid downflow zone, means for admitting gas near the bottom of the upflow zone and means for discharging the gas at the top of the reaction vessel, said dividing means having a vertical slot of predetermined width and depth in its upper end and being configured to have a resistance to flow between 1 and 4 times the sum of flow resistances from all other causes and baffle means near the top of the downflow zone serving to deflect horizontally flowing liquid into a horizontal flow zone prior to its passage down into the downflow zone, and the cross sectional area of the downflow zone being in the range of 5 to 25% of the total cross sectional area of the reactor.

In a preferred embodiment the zone of liquid horizontal flow comprises a series of vertical slots intersecting the horizontal liquid path combined with a series of means for deflecting the liquid in the horizontal plane.

It will be apparent that the introduction of restrictions to the liquid flow path by the slots would tend, other things being equal, to reduce the liquid flow. The size of the slots must therefore be arranged so that while giving a high degree of deaeration they do not introduce a frictional resistance to liquid flow which is excessively large in relation to the other resistances to the liquid flow, arising from drag at the surfaces within the vessel and velocity head losses due to changes of direction. It is a surprising feature of the present invention that the resistance which may advantageously be introduced by the slots in order to secure adequate de-aeration may be several times larger than that arising from all other features along the liquid flow path, and yet lead to an overall increase of liquid circulation. It is well known that pressure drops resulting from drag and loss of velocity head may be approximately expressed in the form $Av^2$, $Bv^2$, $Cv^2$ etc. where $v$ is the linear velocity of flow for example in the zone of liquid upflow, and A, B, C etc. are coefficients depending on the geometry of the system through which the liquid is flowing, and on the physical properties of the liquid; these coefficients may be calculated theoretically. A similar coefficient S may be calculated expressing the resistance of the slot S depending on the width of the slot and the depth to which the slot is submerged by the liquid. As a basis for design of the slot, it has been found that the value of S should not exceed $4 \times (A+B+C+ \ldots)$, the term in brackets representing the sum of the flow resistance coefficients arising from all other causes; but to secure adequate de-aeration, a slot should be used which interposes a resistance term S at least equal to $(A+B+C \ldots)$. This is to say the resistance to liquid flow of the slot should be between one and four times the sum of the flow resistance coefficients arising from all other causes. This factor in association with the relative proportions of the cross sectional area of the downflow zone and the cross sectional area of the reactor as a whole has been found to produce the most efficient results.

Figures 2, 3:
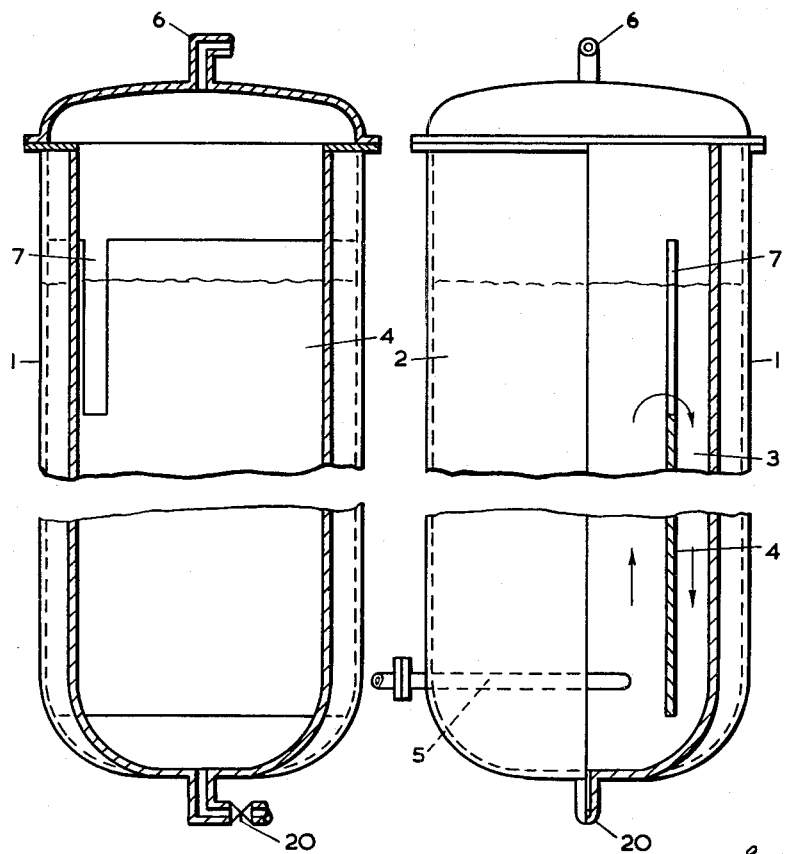

The invention is further illustrated with reference to the accompanying drawings. In the drawings FIGURE 1 represents a horizontal section through a reactor above the gas introduction means while FIGURE 2 is a diametral sectional view on line II—II and FIGURE 3 is a stepped section along the lines III—III of FIGURE 1. FIGURE 4 represents a plan of a second embodiment of the invention relating to a reactor of relatively large diameter, e.g. 2 to 20 feet. FIGURE 5 represents a side elevation of this embodiment cut away at the top and FIGURE 6 is an enlarged horizontal section along the lines VI—VI in FIGURE 5.

Referring to the embodiment shown in FIGURES 1 to 3, this consists of a tubular reactor 1 divided into a zone of liquid upflow 2 and a zone of liquid downflow 3 by means of a partition 4. Means 5 are positioned at the bottom of the zone 2 for the introduction of a gaseous phase, and means 6 are positioned at the top of the reaction vessel for the withdrawal of the gaseous phase. The reaction vessel is also provided with means 20, for the introduction and withdrawal of the liquid phase. The partition 4 contains a vertical slot 7. In operation the effective area of the slot 7, which is determined by the width of the slot and by the height during circulation of the liquid in zone 2 above the bottom of the slot, is controlled so that the resistance of the slot to liquid flow is not substantially more than 80% of the total theoretical resistance to liquid flow in the reaction vessel, by adjustment to the volume of the liquid phase in the vessel and to the volume of the gaseous phase introduced by means 5. In this embodiment the internal wall of the vessel at 8 constitutes the means for deflecting the liquid in the horizontal plane; as a result of impinging on the wall 8 the liquid is deflected in the direction of the arrow A in FIGURE 1, and flows horizontally in this direction before liquid downflow commences.

Referring to the embodiment illustrated in FIGURES 4 to 6, this consists of a tubular reactor 9 divided into a zone of liquid upflow 10 and a zone of liquid downflow 11 by means of a tubular partition 12 supported within the reactor by means not shown. Means 13 are positioned at the bottom of the zone 10 for the introduction of a gaseous phase, and means 14 are positioned at the top of the reaction vessel for the withdrawal of the gaseous phase. The reaction vessel is also provided with means 21 for the introduction and withdrawal of the liquid phase. On top of the tubular partition 12 is mounted a labyrinth 15 made up of six baffles radiating from the axis of the labyrinth which is also the axis of the tubular partition 12. Each baffle consists of three sections, a radial section 16, a chord section 17, and a circumferential section 18. The vertical outer edge of each baffle defines a vertical slot 19 with the adjacent baffle. On entering the labyrinth through the slots the liquid is deflected in the direction of the arrow B in FIGURE 6, and flows horizontally in this direction before liquid downflow commences.

In operation, the combined effective areas of the slots 19, which are determined by the width of the slots and by the height of the liquid in zone 10 above the top of the partition 12, during circulation, are controlled so that the total resistance of the slots to liquid flow is not more than 80% of the total theoretical resistance to liquid flow in the reaction vessel, by adjustment to the volume of the liquid phase in the reactor and to the volume of the gaseous phase introduced by means 13.

It will be appreciated that the embodiments illustrated in FIGURES 1–6 can be varied in many ways without departing from the spirit of the invention. Thus, the labyrinth in FIGURES 4–6 preferably consists of six baffles but could contain a smaller or larger number if desired. Similarly the baffles could be constructed so as to bend in a clockwise manner from the centre instead of counter-clockwise as shown in FIGURES 4 and 6, and they could be curved instead of angular.

The reaction vessel of the present invention is further illustrated with reference to the following comparative examples.

*Example 1*

A tubular reactor of the type shown in FIGURES 1 to 3 had a diameter of 11 inches, and a height of 22 feet, and was divided into a zone of liquid upflow and a zone of liquid downflow by means of a non-diametrical partition occupying a chord of the cross section of the reactor. The cross sectional area of the zone of liquid downflow represented about 18% of the total internal cross sectional area of the reactor. The width of the partition was 9.4 inches. At the top of the partition a vertical slot, 2 inches in width, was positioned in the partition adjacent to the reactor wall.

Circulation rates in the reactor were measured by the use of Pitot tubes, using water as the liquid phase and air as the gaseous phase, under conditions of atmospheric temperature and pressure. Air was supplied in a dispersed state into the bottom of the zone of liquid upflow at a rate of about 250 cubic feet per hour, the level of the liquid phase in the reactor being about 10 inches above the base of the slot. Under these conditions circulation rates of about 43,000 lbs./hour were obtained.

In comparison with this reactor according to the present invention, when the slot was removed, with the same rates of air supply the circulation rate was only of about 22,000 to 23,000 lbs./hour. In this case the level of the liquid phase was again approximately 10 inches above the top of the partition during circulation.

*Example 2*

In this example the tubular reactor was similar to that described in Example 1, except that the partition was positioned so that the cross-sectional area of the zone of liquid downflow was approximately 8% of the total internal cross-sectional area of the reactor. The width of the partition was 7.6 inches, and there was a slot 1.4 inches in width in the partition adjacent to the reactor wall. Dispersed air was supplied at a rate of about 250 cubic feet per hour into the bottom of the zone of liquid upflow, the level of the liquid phase in the reactor being approximately 10 inches above the base of the slot. The liquid phase circulated in the reactor at a rate of about 22,000 lbs./hour.

When the slot was removed, so that the liquid phase overflowed over the top of the partition, circulation rates of only about 15,000 lbs./hour were obtained for the same rate of air supply; in this case the level of the liquid phase was again maintained at about 10 inches above the top of the partition.

*Example 3*

A tubular reactor of the type shown in FIGURES 4 to 6 had a height of 18 feet and an internal diameter of 7 feet. The zone of liquid downflow was formed by a central cylindrical tube 13 feet in height and 27 inches in internal diameter; this occupied 10% of the total cross sectional area of the reactor. On top of the central cylindrical tube was fitted a labyrinth, as shown in FIGURE 6, containing 6 vertical slots each 4½ inches in width. With an air supply to the base of the zone of liquid upflow of between 10,000 and 20,000 cubic feet/hour, the depth of the liquid phase (water) over the base of the slots in the labyrinth being 15 inches, circulation rate of between 1,200,000 and 1,700,000 lbs./hour were obtained. When the depth of the liquid phase over the base of the slots in the labyrinth was increased to 25 inches, and the air supply was maintained at 20,000 cu. ft./hour, a circulation rate of 2,200,000 lbs./hour was obtained.

By way of comparison with this reactor according to the present invention, when the labyrinth was removed, with an air supply of 20,000 cu. ft./hour, at a level of the liquid phase of about 15 inches above the top of the central cylindrical tube, the circulation rate was only 500,000 lbs./hour.

We claim:
1. A reaction vessel comprising:
  (a) a hollow body portion;
  (b) means for filling said hollow body portion with liquid to a predetermined liquid level;
  (c) means for dividing the hollow body portion into a liquid upflow zone, and a liquid downflow zone having a cross-sectional area in the range of 5 to 25% of the total cross-sectional area of the vessel, said means intersecting the liquid level in the vessel when said vessel is filled with liquid during use and having a vertical slot in its upper end which vertical slot intersects the liquid level and has a resistance to flow in the range of one to four times the sum of flow resistances from all other causes in the reaction vessel;
  (d) means for admitting gas near the bottom of the upflow zone;
  (e) means for discharging the gas at the top of the reaction vessel; and
  (f) baffle means disposed near the top of the downflow zone serving to deflect liquid into a horizontal flow zone prior to its passage down into the downflow zone.

2. A reaction vessel according to claim 1, in which the dividing means terminates short of the upper and lower ends of the hollow body portion.

3. A reaction vessel according to claim 1, in which the dividing means is a plate asymmetrically disposed within the hollow body portion.

4. A reaction vessel according to claim 1, in which the dividing means is tubular.

5. A reaction vessel according to claim 1 in which the dividing means is tubular and has a series of radially positioned baffles mounted thereon.

References Cited by the Examiner

UNITED STATES PATENTS

| | | | |
|---|---|---|---|
| 1,642,206 | 9/1927 | Imhoff | 210—221 X |
| 1,669,215 | 5/1928 | Smoot | 261—121 |
| 2,081,287 | 5/1937 | Aldridge | 261—121 |
| 2,081,432 | 5/1937 | Hapgood | 261—121 |
| 2,111,727 | 3/1938 | Plews. | |
| 2,353,358 | 7/1944 | Prager | 210—220 X |
| 2,444,671 | 7/1948 | Prager | 210—197 |
| 2,549,565 | 4/1951 | Benner | 23—285 X |
| 2,653,907 | 9/1953 | Griffith | 210—221 X |
| 2,720,447 | 10/1955 | Jones et al. | 23—285 |
| 2,987,186 | 6/1961 | Burgoon et al. | 210—197 |

HARRY B. THORNTON, *Primary Examiner.*

RONALD R. WEAVER, *Examiner.*

D. M. RIESS, *Assistant Examiner.*